United States Patent
Muresan et al.

(10) Patent No.: US 6,885,383 B2
(45) Date of Patent: Apr. 26, 2005

(54) MOVING-PIXELS PROCEDURE FOR DIGITAL PICTURE EDGE-SMOOTHING

(75) Inventors: David Darian Muresan, Seattle, WA (US); Maria Muresan, Seattle, WA (US)

(73) Assignee: David Muresan, Seattle, WA (US)

(*) Notice: Subject to any disclaimer, the term of this patent is extended or adjusted under 35 U.S.C. 154(b) by 202 days.

(21) Appl. No.: 10/092,634

(22) Filed: Mar. 8, 2002

(65) Prior Publication Data

US 2003/0169276 A1 Sep. 11, 2003

(51) Int. Cl.[7] .................................................. G09G 5/00
(52) U.S. Cl. ........................ 345/611; 345/612; 345/613
(58) Field of Search ................................ 345/611–615; 382/266–269

(56) References Cited

U.S. PATENT DOCUMENTS

| | | | | |
|---|---|---|---|---|
| 5,365,251 A | * | 11/1994 | Denber | 345/611 |
| 5,774,110 A | * | 6/1998 | Edelson | 345/601 |
| 6,525,741 B1 | * | 2/2003 | Klassen et al. | 345/589 |
| 6,654,017 B1 | * | 11/2003 | Ali-Santosa | 345/443 |
| 2003/0142878 A1 | * | 7/2003 | Willis et al. | 382/269 |

* cited by examiner

Primary Examiner—Matthew C. Bella
Assistant Examiner—Po-Wei Chen

(57) ABSTRACT

Procedure for digital picture edge-smoothing refers to a method of smoothing the rough edges, around the objects, in a digital picture, as a result of enlargement. The procedure consists of detecting the rough edges and removing some pixel(s), so that edge will become smoother. If the edge has a 45 degrees angle, made of 2 by 2 pixels, will become an edge of 1 by 1 pixel. If the edge has 4 by 2 pixels, it will become a 2 by 1 pixel edge.

1 Claim, 3 Drawing Sheets a b a (Prior art)　　b (Prior art)　　c a (Prior art) original 1/8
b (Prior art)
c a (Prior art) original 1/8
b (Prior art)
c though many features may be novel, I claim as my invention:

MOVING-PIXELS PROCEDURE FOR DIGITAL PICTURE EDGE-SMOOTHING

BACKGROUND OF THE INVENTION

This invention refers to a procedure of smoothing the rough edges of a digital picture, by moving around the pixels resulting from pixel replication enlargement.

The existing procedure uses a different color for pixels placed on the edges. The pixels are not moved, but only changed their color (their RGB value). The new color is an average of the neighboring pixels. Pixels could participate in different ratio to the new color. This is an edge-smoothing procedure, by different-color.

The disadvantage of edge-smoothing procedure, by different-color is a lost of contrast around the edges. The picture has blurred edges and is not clear.

SUMMARY OF THE INVENTION

The object of this invention is a procedure to remove all the pixels placed in the farthest corner of the edge and replacing them with background pixels. As the picture is enlarged twice using pixel replication, each pixel in the picture will be replaced with four equals and arranged in a square. If these squares are placed next each other, horizontally or vertically, no rough edges will result. If they are placed to form an inclined line (45 degrees or less) one pixel in each square will be far from the line center. That pixel is a rough-edge pixel and that edge is a two-pixel edge. This edge will be visible and rough.

In order to smooth the edge, a computer procedure is necessary to detect the rough-edge pixels and move them in a right position or to replace them with background pixel. This is an edge-smoothing procedure, by moving-pixels.

The advantage of this invention is a smooth edge and a high contrast. All details will remain clear.

DETAILED DESCRIPTION OF ILLUSTRATIVE EMBODIMENT

Figure 1:
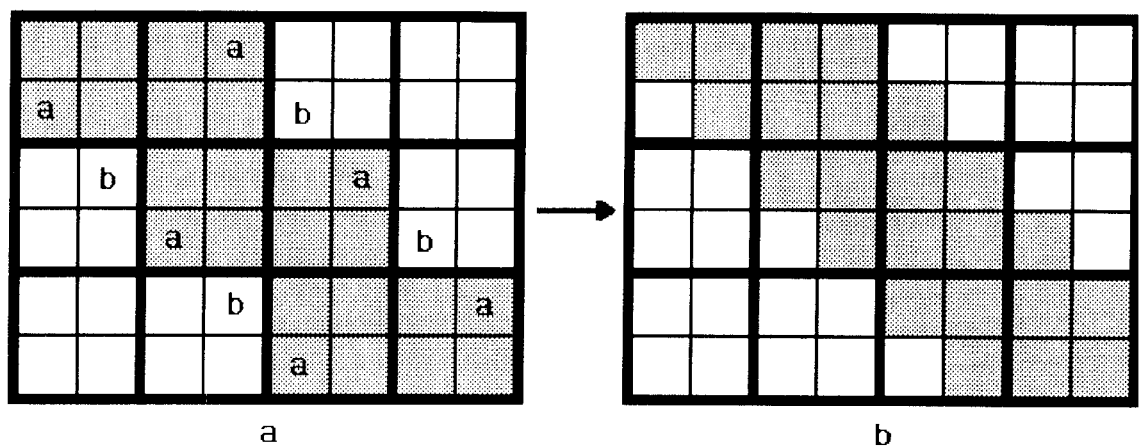
FIG. 1a, shows a 2 by 2 picture edge, as result of enlargement, by pixel replication.
FIG. 1b, shows a 1 by 1 picture with edges smoothed by moving-pixels procedure.

In FIG. 1 a are 2 by 2 edges at 45 degrees. To smooth these edges we can replace the pixel "a" with "b" or "b" with "a". To keep the size of the line the same, in one side are replaced "a" with "b" and in the other side "b" with "a". The pixels "a" and "b" are just moved in another position. Their RGB value is the same. The picture contrast and clarity will be the same. FIG. 1b is the edge smoothed by moving-pixels procedure.

The Prior-Art procedure to smooth the edges consists of combining the colors of "a" and "b" and placing them on both positions "a "and "b". The "a" and "b" RGB color is an average of "a "and "b" RGB color. The new color of "a "and "b" is like (a+b)/2. This formula is applied for every R(red),G(green),B(blue) colors of the pixels "a" and "b". That color does not exist in the "a "and "b" neighborhood so the procedure is called a different-color procedure. The "a "and "b" new color will be like a fog exactly on the edge. It will give a blurred edge, and will reduce the picture contrast. In practice much more than "a "and "b", pixels will have the color changed. That will reduce the clarity of picture's details.

Figure 2:
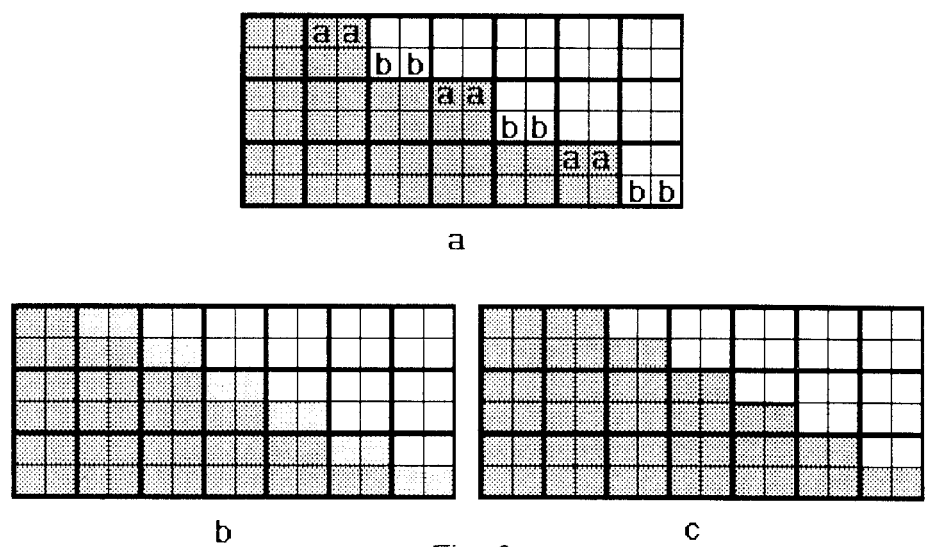
FIG. 2a, shows a 4 by 2 picture edge, as a result of enlargement by pixel replication.
FIG. 2b, shows a picture with edges smoothed by different-color procedure.
FIG. 2c, shows a 2 by 1 picture with edges smoothed by moving-pixels procedure.

In FIG. 2a is an edge with 4 by 2 pixels. To smooth this edge, two "a" and two "b" has to be moved or changed colors. FIG. 2b shows the 4 by 2 edge smoothed into 2 by 1 edge by moving-pixels procedure (the object of this invention). FIG. 2c shows the 4 by 2 edge smoothed by different-color procedure (the object of prior-art).

Figure 3:
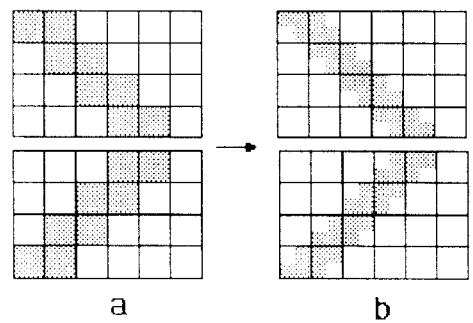
FIG. 3a, shows all the situations possible when the edge has to be smoothed.
FIG. 3b, shows all the situations with edges smoothed by moving-pixels procedure.
Figure 4:
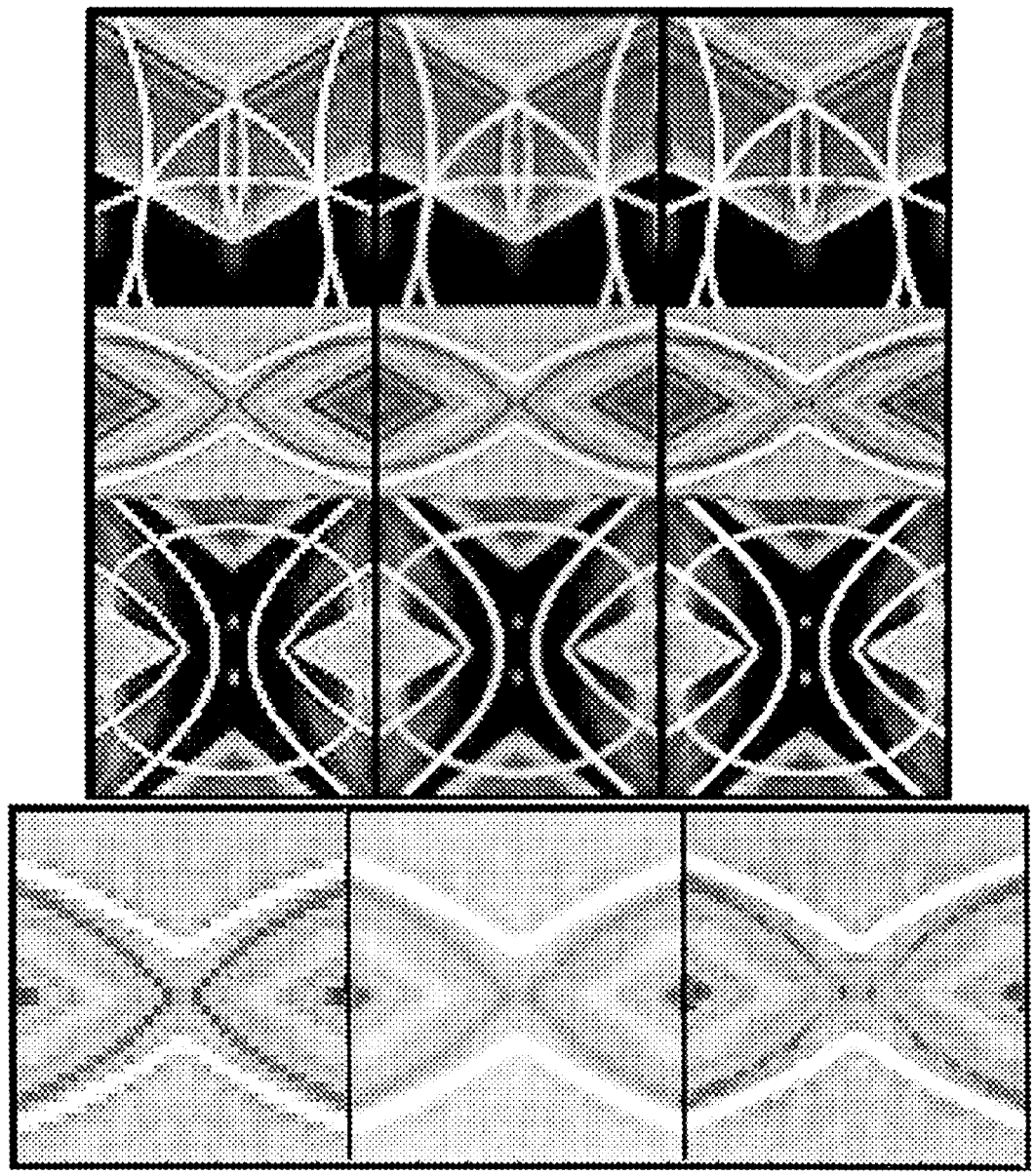
FIG. 4a, shows a color picture enlarged by pixel replication procedure.
FIG. 4b, shows 4a picture with edges smoothed by different-color procedure.
FIG. 4c, shows 4a picture with edges smoothed by moving-pixels procedure.
Figure 5:
FIG. 5a, shows a picture enlarged by pixel replication procedure.
FIG. 5b, shows 5a picture with edges smoothed by different-color procedure.
FIG. 5c, shows 5a picture with edges smoothed, by moving-pixels procedure.
Figure 6:
FIG. 6a, shows a picture enlarged by pixel replication procedure.
FIG. 6b, shows 6a picture with edges smoothed by different-color procedure.
FIG. 6c, shows 6a picture with edges smoothed, by moving-pixels procedure.

All possibilities of edges are shown in FIG. 3. Two for positive slope (one above and one below), and two for negative slope (one above and one below). The FIG. 4 shows a picture enlarged by pixel replication (a), and smoothed by different-color (b) and moving-pixels procedure (c). FIG. 5 and FIG. 6 show pictures enlarged by pixel replication (a) and smoothed by different-color procedure (b), and by moving-pixels procedure (c).

Both these procedures are practically implemented by a computer programming, specific for different kinds of pictures.

In FIG. 7b, is a basic code for different-color procedure and in FIG. 7a is a basic code for moving-pixels procedure. The four pixels which forms a square are named: p(2,2), p(2,3), p(3,2) and p(3,3). Neighbors pixels are named p(1,1), p(1,2), p(1,3), p(1,4), p(2,1), p(2,4), p(3,1), p(3,4), p(4,1), p(4,2), p(4,3) and p(4,4).

The "if" statements in FIG. 7a, are designed to detect the rough-edge pixels, and the next statement will move the pixels. There are four lines of code, one for each possibility. (as shows in FIG. 3a).

In the beginning of this section we described a method for smoothing local edges at 45 degrees (in images that have been interpolated two times using pixel replication) once pixels "a" and "b" are detected. To clarify, this invention now describes a method of detecting pixels "a" and "b" when we are dealing with black and white images, such as line drawings. Detection is achieved by looking at every pixel and analyzing its neighbors to see if the pixel is a corner pixel. A pixel is labeled "a" if the pixel is a black corner and by "b" if the pixel is a white corner pixel. A black corner can be detected if the pixel is black and at least one of the following holds:

1. the immediate neighbors at −45, 0, 45, 90, and 135 degrees are white while the immediate neighbors at 180, −90, and −135 degrees are black
2. the immediate neighbors at 135, 180, −135, −90, −45 degrees are white while de immediate neighbors at 0, 45, 90 degrees are black
3. the immediate neighbors at −135, −90, −45, 0, 45 degrees are white while de immediate neighbors at 90, 135, 180 degrees are black
4. the immediate neighbors at 45, 90, 135, 180, −135 degrees are white while de immediate neighbors at −90, −45, 0 degrees are black A pixel is labeled "b" in a fashion similar to the procedure described above but switching the words "white" with "black".

The labeling process for a color image is obtained by first thresholding the color image (i.e. saying that pixels above a certain threshold are white and the rest are black) and then detecting black or white corners as suggested above.

We claim:

1. An edge-smoothing procedure for black and white images that are interpolated two-times using pixel replication comprising of:

labeling each pixel in the interpolated image by "a" if the pixel is black and:

the immediate neighbors at −45, 0, 45, 90, 135 degrees are white while the immediate neighbors at 180, −90, −135 degrees are black or the immediate neighbors at 135, 180, −135, −90, −45 degrees are white while the immediate neighbors at 0, 45, 90 degrees are black or the immediate neighbors at −135, −90, −45, 0, 45 degrees are white while the immediate neighbors at 90, 135, 180 degrees are black or the immediate neighbors at 45, 90, 135, 180, −135 degrees are white while the immediate neighbors at −90, −45s 0 degrees are black;

labeling each pixel in the interpolated image by "b" if the pixel is white and the immediate neighbors at −45, 0, 45, 90, 135 degrees are black while the immediate neighbors at 180, −90, −135 degrees are white or the immediate neighbors at 135, 180, −135, −90, −45 degrees are black while the immediate neighbors at 0, 45, 90 degrees are white or the immediate neighbors at −135, −90, −45, 0, 45 degrees are black while the immediate neighbors at 90, 135, 180 degrees are white or the immediate neighbors at 45, 90, 135, 180, −135 degrees are black while the immediate neighbors at −90, −45,0 degrees are white;

selectin a replacement rule: ("a" replaces "b") or ("b" replaces "a");

replacing all the "a" labeled pixels with the "b" labeled pixels if the rule is ("a" replaces "b"); and replacing all the "b" labeled pixels with the "a" labeled pixels if the rule is ("b" replaces "a").

* * * * *